United States Patent
Strandell (10) Patent No.: US 9,694,439 B2
(45) Date of Patent: Jul. 4, 2017

(54) BEARING COMPONENT PART AND A METHOD TO FORM A BEARING COMPONENT

(71) Applicant: Ingemar Strandell, Sävedalen (SE)

(72) Inventor: Ingemar Strandell, Sävedalen (SE)

(73) Assignee: AKTIEBOLAGET SKF, Gothenburg (SE)

( * ) Notice: Subject to any disclaimer, the term of this patent is extended or adjusted under 35 U.S.C. 154(b) by 107 days.

(21) Appl. No.: 14/783,455

(22) PCT Filed: Apr. 7, 2014

(86) PCT No.: PCT/SE2014/000042
§ 371 (c)(1),
(2) Date: Oct. 9, 2015

(87) PCT Pub. No.: WO2014/168546
PCT Pub. Date: Oct. 16, 2014

(65) Prior Publication Data
US 2016/0303682 A1    Oct. 20, 2016

(30) Foreign Application Priority Data
Apr. 12, 2013    (SE) ..................... 1300270

(51) Int. Cl.
F16C 33/34    (2006.01)
F16C 33/62    (2006.01)
(Continued)

(52) U.S. Cl.
CPC .......... B23K 20/023 (2013.01); B23K 20/026 (2013.01); B23K 20/227 (2013.01);
(Continued)

(58) Field of Classification Search
CPC  B20K 20/026; B20K 20/227; B20K 2203/04; B20K 2203/05; B20K 2203/06;
(Continued)

(56) References Cited

U.S. PATENT DOCUMENTS 3,748,722 A    7/1973  Moore
5,306,565 A *  4/1994  Corbin .................. C04B 35/806
                                                          384/907.1
(Continued)

FOREIGN PATENT DOCUMENTS

EP     0863323 A1     9/1998
FR     1517274 A  *  3/1968  ......... B23K 15/0046
JP     03031425 A *  2/1991  ............... B21H 1/12

*Primary Examiner* — Phillip A Johnson
(74) *Attorney, Agent, or Firm* — Bryan Peckjian; SKF USA Inc. Patent Dept.

(57) ABSTRACT

A bearing component part for use in a diffusion welding process, comprising a core part presenting a first circumferential surface, at least one annular part presenting a second circumferential surface, wherein the core part and the annular part are attached to and along each other in a circumferential manner through their first circumferential surface and second circumferential surface. The at least one annular part is substantially u-shaped in a cross sectional view, comprising two opposing sides connected by a base side together forming a space. The at least one annular part is arranged to receive a first material in the space formed by the u-shape.

22 Claims, 5 Drawing Sheets (51) Int. Cl.
  *F16C 33/64* (2006.01)
  *B23K 20/02* (2006.01)
  *B23K 20/227* (2006.01)
  *B23K 103/04* (2006.01)
  *B23K 103/18* (2006.01)

(52) U.S. Cl.
  CPC .............. *F16C 33/34* (2013.01); *F16C 33/62* (2013.01); *F16C 33/64* (2013.01); *B23K 2203/04* (2013.01); *B23K 2203/05* (2015.10); *B23K 2203/18* (2013.01); *F16C 2226/36* (2013.01)

(58) Field of Classification Search
  CPC .... B20K 2203/18; F16C 33/34; F16C 33/588; F16C 33/62; F16C 33/64; F16C 2226/36
  See application file for complete search history.

(56) References Cited

U.S. PATENT DOCUMENTS

| | | | |
|---|---|---|---|
| 2002/0174545 A1 | 11/2002 | Kiyosawa | |
| 2007/0214644 A1 | 9/2007 | Kanai et al. | |
| 2011/0311362 A1* | 12/2011 | Corts | F16C 33/60 416/174 |
| 2012/0248859 A1* | 10/2012 | Knopf | B22D 19/04 301/109 |
| 2014/0197678 A1* | 7/2014 | Olivieri | B60B 27/0078 301/110 |

* cited by examiner

BEARING COMPONENT PART AND A METHOD TO FORM A BEARING COMPONENT

CROSS REFERENCE TO RELATED APPLICATION

This is a United States National Stage Application claiming the benefit of International Application Number PCT/SE2014/000042 filed on 7 Apr. 2014 (07.04.2014), which claims the benefit of Sweden (SE) Patent Application 1300270-4 filed on 12 Apr. 2013 (12.04.2013), both of which are incorporated herein by reference in their entireties.

TECHNICAL FIELD

According to a first aspect, the invention presents a bearing component part, such as a part to an outer ring, an inner ring or a roller of a roller bearing.

According to a second aspect, the invention presents a forming method of a bearing component using the part according to the first aspect of the invention.

According to a third aspect, the invention presents a bearing component formed by using the bearing component part according to the first aspect of the invention.

BACKGROUND OF THE INVENTION

Rolling bearings are well known and comprise roller bearings, ball bearings and also combinations thereof. In recent years an increased differentiation of customers' needs and demands has been seen. This has resulted in an increase in customization of rolling bearings, which in turn has lead to that more variants and smaller batches of each variant is manufactured. This development has especially been seen for larger rolling bearings, such as larger spherical roller bearings, tapered roller bearings, cylindrical roller bearings etc. Also, larger rolling bearings are often manufactured in smaller series since these bearings often are manufactured on direct customer orders and are not manufactured and put on stock. The different customer demands relate to e.g. different material demands, different demands on material hardness, wear characteristics, ductility, heat resistance etc. In addition, the higher customer demands often relate to a need to customize and optimize the rolling contact surfaces between the bearing components. Therefore, there is a need to find a cost effective solution that could increase the ability to offer different customized solutions for customers with different needs and to be able to fulfill the high and increasing demands on improved rolling contact surfaces.

SUMMARY OF THE INVENTION

An object of the invention is to provide a solution to the above identified needs.

According to the first aspect of the invention, the object has been achieved by providing a bearing component part for use in a diffusion welding process. The bearing component part for use in a diffusion welding process comprises a core part presenting a first circumferential surface and at least one annular part presenting a second circumferential surface. The core part and the annular part are attached to and along each other in a circumferential manner through their first and second circumferential surfaces. The at least one annular part is substantially u-shaped in a cross sectional view, comprising two opposing sides connected by a base side together forming a space, wherein the at least one annular part is arranged to receive a first material in the space formed by the u-shape. By providing the bearing component part having this substantially u-shaped annular part, the forming method becomes easier since the first material to join to the core part is conveniently collected and located against the surface to where it is supposed to join. There can also be several u-shaped annular parts attached to the circumferential surface when it is not desired to join a first material to the full circumferential surface, but only to parts of it, such as when joining several ornaments, such as flanges etc. By providing this bearing component part, the overall process of forming a bearing component is simplified, since the u-shaped annular part is already attached to the core part ready to fill with the first material and is easy to handle. The quality in terms of tolerances can be assured early in the process. The bearing component part, often a less critical component when it comes to the performance of the final bearing, can be outsourced to a supplier. Later the bearing component part can be used by the company making the final bearing component according to the specific product specification from customers, for instance by adding the required first material in the space of the u-shape and perform the final machining/forming of the end shape. Further by having the u-shaped annular part attached to the side where the first material supposed to be applied enables less material of the expensive qualitative material can be used, in comparison to for instance lowering the bearing component in a capsule to gather the first material all around component to be joined.

The annular part is substantially u-shaped in a cross-sectional view. By substantially u-shaped is also meant that there can be additional features to it to follow the end shape of the final bearing component. For spherical surfaces, such as in spherical roller bearings (SRB) or a toroidal bearing the u-shape would be bent along the spherical shape for instance. For a deep groove ball bearing (DGBB) one of the sides in the u-shape could have a groove shaped feature to form the raceway groove. For a tapered roller bearing the u-shape could actually be more in the shape of a V. Also the u-shaped part can have additional features in the shape to form additional portions to the end component, such as flanges etc.

By axial direction is meant the direction in line with the envisioned shaft the bearing is supposed to be connected to. By radial direction is meant the direction perpendicularly from the center of the envisioned shaft. Thus by the cross-sectional view of the annular part is meant the surface made in the axial direction of the shaft and out in radial direction, thus the surface of the cross sectional view will cross the center of the shaft along its axial length.

In an embodiment of the bearing component part the second circumferential surface of the annular part being connected to the core part is one of the opposing sides of the u-shape. The attachment procedure can be performed by welding, using hot components, using a geometrical fit and a heat difference to join components, by gluing, mechanical fastening or any other method known to the person skilled in the art. Surfaces may need to be cleaned and mechanically or chemically activated to improve the bond between the materials. An additional method could be to plastically deform the material by a rolling process. This process may be done in parallel to a local surface heating process. The u-shape can be explained having a base side connecting two opposing sides stretching in parallel perpendicularly from the base side. For instance when the joined first material will comprise a radial raceway of the ring of the final bearing component, the bearing component part will have the u-shaped circular part attached like this so that the ring can be laid down horizontally and the opening of the u-shaped circular part is directed upwards so that the material to join can be filled in the space made my the u-shaped circular part and contained there by the force of gravity. If it is an inner ring the u-shaped circular part will be joined on its radially inner opposing side on to the ring's radially outer circumferential surface. The same principle applies if it is the outer surface of a roller that shall be formed. If it is an outer ring the u-shaped circular part will be joined on its radially outer opposing side onto the ring's radially inner circumferential surface.

In an embodiment of the bearing component part, the second circumferential surface of the annular part being connected to the core part is the base side of the u-shape. This can for instance be beneficial when joining a surface of an axial thrust bearing, so that the material can be put onto the surface and kept there by the force of gravity.

In an embodiment of the bearing component part, the annular part is a low carbon steel. In a further embodiment the low carbon steel has a carbon content of less than 0.3 weight % (wt %), but it could easily be as low 0.05 wt % and as high as 0.6 wt %. In another embodiment the low carbon steel is a ferritic steel. By having a material with very low carbon content, the material will attract carbon from both the first and the second material, slowly evening out the differences in carbon content between the first and second material, since the carbon content of both the first and second material is higher than the low ferritic steel. This way the process is controlled so that no weak and brittle cementite or other unwanted complex carbides are created, and the strength of the transition zone is further ensured. In another embodiment of the method, the annular part is a sheet metal. This way it can easily be formed to encapsulate and abut the core part. In yet another embodiment of the method the thickness of the annular part is 0.5-10 mm thick. The thickness is selected in relation to process temperature and time in such way that the material which will be subjected to the highest stress is neither carbon enriched nor significantly carbon depleted. The core material is allowed to be slightly depleted in carbon while the annular part material is enriched with carbon allowing it to be at least partly having a martensitic structure in a following hardening operation. In another embodiment the annular part also contains nitrogen. This is to prevent nitrogen from diffusing from the material to be filled into u-shaped annular part that will constitute the high load and endurance part, since the nitrogen diffusion from this material could affect its material properties negatively. In a further embodiment several annular parts are put on the core part in order to allow for the carbon to diffuse in a controlled and optimum manner.

In an embodiment of the bearing component part, the core part is a cast iron. In a further embodiment the core part is a cast iron with a carbon content of at least 2%. A cast iron typically contains between 2.1-4 wt % carbon. In yet another embodiment of the method the core part is a cast steel. In a further embodiment the core part is a cast steel with a carbon content of 0.5 wt % or less, but it could be as much as 2 wt %. These materials are often cheaper than high cleanliness steels, thus preferably the main part of the component can be made by cast iron or cast steel, after which the more expensive high cleanliness steel can be applied at the most critical areas that requires it. In another embodiment this cast iron/steel core part of is formed by casting. This is cheaper than other traditional forming methods, but it could of course also be made by rolling or forging or any other warm or cold working method. This part may be the main part of a bearing component, for instance in the case of a bearing it could be the central part of a roller, or the ring part that does not constitute the part enduring heavy load, such as the raceway or flange.

According to the second aspect of the invention, the object has been achieved by providing a method to form a bearing component by means of diffusion welding. The method comprises the steps of first providing a bearing component part as described according to the first aspect of the invention where a first material is placed in the space formed by the u-shaped annular part. Then the space formed by the u-shaped annular part is sealed creating a closed space, after which the diffusion welding process is performed. By providing the bearing component part having this substantially u-shaped annular part, the forming method becomes easier since the material to join to the core part is conveniently collected and located against the surface to where it is supposed to join. The u-shaped annular part also functions as an intermediate material between the core part and the first material to be joined. When forming high quality components that need to endure high loads during a long period of time, such as bearings or pressing tools etc, known methods to join two materials by diffusion welding or hot isostatic pressing are sensitive to generate weak zones in the transition zone where the materials join each other. There may be a carbon potential between the materials, i.e. one of the two joined materials may gain carbon in the joining process while the other material may lose carbon. A carbon potential is explained by the ability of an environment containing active carbon to alter or maintain, under prescribed conditions, the carbon level of a steel. In any particular environment, the carbon level attained will depend on such factors as temperature, time and steel composition. Carbon potential is thus a difference in carbon activity between e.g. two materials. Thus if there is a difference in carbon activity, i.e. when the carbon potential is not zero, the carbon will diffuse from one material to the other. The carbon gradients in the two materials may result in weak and brittle phases during a subsequent heat treatment. A transition zone with larger fraction of weaker brittle microstructure phases such as cementite networks or complex metal carbides may significantly reduce the strength of any or both of the two joined materials. By selecting the alloying content of the two joining materials and/or adopting the process temperature the diffusion rate of carbon between the materials can be reduced. The hardening properties of both alloys are then to a large extent preserved and the volumes surrounding the transition zone will not have large volume of weak or brittle phases. The two materials keep its ability and microstructure all the way to the transition zone. The size of the transition zone is reduced and the potential problems of material brittleness etc. are reduced. The inventor has realized that some materials that could be of benefit to join with each other still do have a high carbon potential even though the alloying content and the temperature is adapted to reduce this difference. This is for instance the case when joining materials of different qualities, such as joining a cheaper cast iron or cast steel having high carbon content with a high cleanliness steel with low carbon content. By having a material in between the core part and the first material, this enable a qualitive join by diffusion welding of two otherwise incompatible materials.

In an embodiment of the method to form a bearing component, the first material and the core part present a carbon potential at the temperature of joining. When joining two materials by diffusion welding it is good if the two materials have no carbon potential, i.e. the materials have roughly the same carbon activity, to prevent carbon from diffusing from one material to the other. In some cases there are possibilities to find a common carbon activity between the materials by adapting the carbon content in relation to each other and/or adapting the joining temperature. In some cases there are no possibilities to find a common carbon activity, it could be because it is not possible to adapt the temperature due to production economic reasons, the qualities of the materials to join are so specific that it is not possible to amend the carbon content of them. It could also be because it simply not physically possible to find a common carbon activity even if the above methods are tried, such as for instance some cast irons and high cleanliness bearing steels. It is during these circumstances when this inventive method of including the annular part of another material is particularly applicable with good results.

In an embodiment of the method to form a bearing component, the first material is a high cleanliness steel, such as a bearing or tool steel. Of special interest are corrosion resistant and/or wear resistant steels. In an embodiment it is a M50 steel. In a further embodiment it is a M50NIL steel. In yet another embodiment it is any of the traditional bearing steel as shown in ISO 683-17:1999(E) pages 9-10. Any other steels that meet the steel cleanliness and hardness requirements of a bearing component could be used, for instance stainless tool steels. In a further embodiment the material used is a martensitic hardenable stainless N-alloyed steel, such as XD15NW or other stainless martensitic hardenable steels made with good steel cleanliness. The invention is however not limited to these steels. The benefit of using these types of steel is that the portion consisting of this material will be very robust against wear and corrosion for instance. Hence the high cleanliness steel is preferably located around the highly stressed areas of the components, for instance around the raceway of a bearing ring or the rolling surface of a bearing roller. It could also be located for instance at a flange or any other portion or area of a bearing component, or combinations of flange, raceways and rolling surfaces.

In an embodiment of the method to form a bearing component, the method is done by means of hot isostatic pressing. This comprises steps of heating the materials pressing them against each other under specific pressure, period of time and temperature, thereby allowing the materials to diffuse into each other. In an embodiment of the method the temperature of joining is 1000-1300 degrees Celsius (C). In another embodiment of the method, the temperature of joining is 1100-1200 degree C. In a further embodiment of the method, the temperature of joining is 1140-1160 degree C., preferably 1150 degree C. But it could also be 1145-1155 degree C. for instance. In an embodiment of the method the pressure is 80-310 MPa. In an embodiment of the method the time of joining is between 2-4 hours. This is a typical time. Shorter or longer time may be required depending on component thicknesses, such as 1-6 hours.

In an embodiment of the method, the first material is in powder form before heating.

In an embodiment of the method to form a bearing component, the bearing component is any of an inner ring, an outer ring or a roller of a bearing. It could also be the rings or rollers of an axial thrust type bearing.

In an embodiment of the method to form a bearing component, at least one of the opposing sides and the base side of the u-shaped annular part is subsequently removed from the bearing component. In a further embodiment of the method the removal of at least one of the opposing sides and the base side of the u-shaped annular part is made by any of a subsequent grinding step or a subsequent cutting step. This way the high cleanliness steel is revealed to form a high strength surface.

According to a third aspect, the invention presents a bearing component formed by using the bearing component part according to the first aspect of the invention. This way the bearing component has been manufactured in a cost efficient manner, both when it comes to the production method itself as well as the materials used.

BRIEF DESCRIPTION OF DRAWINGS

Exemplifying embodiments will now be described more in detail with reference to accompanying drawings, as well as examples of undesirable features that the invention help to prevent, wherein.

DETAILED DESCRIPTION OF DRAWINGS

Figure 1A:
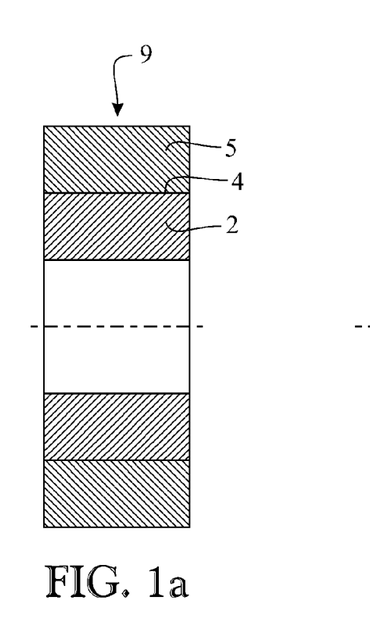
FIG. 1a shows a cross section of a bearing ring made by the method involving the bearing component part according to the invention.

FIG. 1a shows a cross section of a bearing component 9 joined by the method according to the invention, bearing component 9 being a ring. The bearing ring comprises a core part 2 and a first material 5 wherein the diffusion welding process has taken place between the core part 2 and a first material 5, where one side of the u-shaped annular part 4 is located. The radially and/or axially outer sides of the u-shaped annular part 4 have been removed from the bearing component 9. The figure shows a bearing ring, where the materials are aligned along the full width of the component, but it could also be so that the first material 5 is only applied on one or several selected portion of the bearing component 9, such as for instance a raceway or a flange (not shown in figure). When joining several flanges etc made of the first material 5, several u-shaped annular parts can be used simultaneously.

Figure 1B:
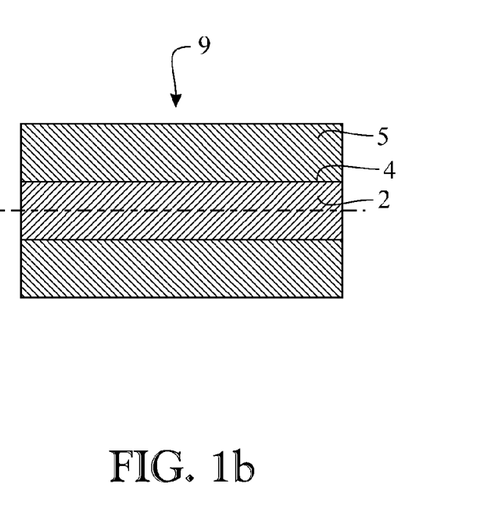
FIG. 1b shows a cross section of a roller for a bearing made by the method involving the bearing component part according to the invention.

FIG. 1b shows a cross section of a bearing component 9 joined by the method according to the invention, bearing component 9 being a roller. The bearing roller comprises a core part 2 and a first material 5 wherein the diffusion welding process has taken place between the core part 2 and a first material 5, where one side of the u-shaped annular part 4 is located. The radially and/or axially outer sides of the u-shaped annular part 4 have been removed from the bearing component 9. The figure shows a roller where the materials are aligned along the full width of the roller, but it could also be so that the first material 5 is only applied on a selected portion of the roller, such as for instance the main rolling surface or at the edges of the roller, etc.

Figure 2:
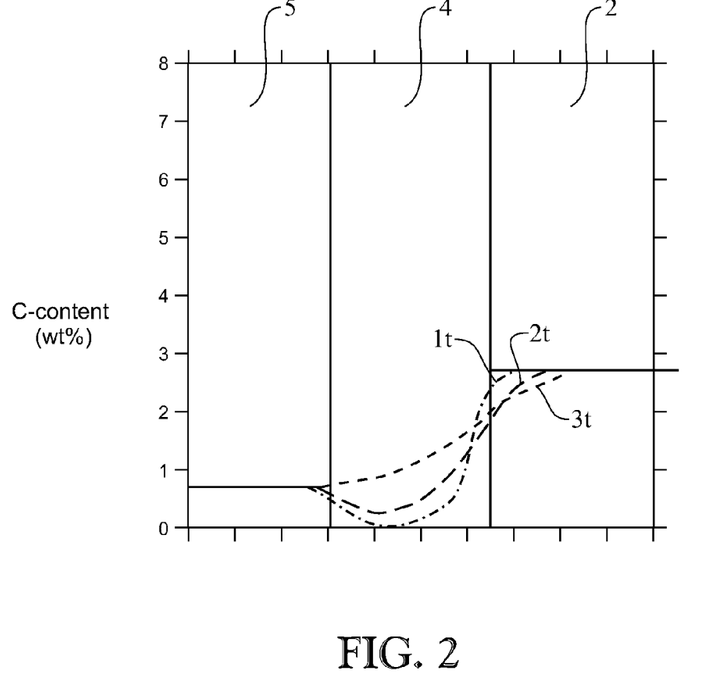
FIG. 2 shows a graph illustrating two materials' carbon content diffusing into an intermediate material according to the invention.

FIG. 2 shows a graph of a desirable carbon content change according to the invention. The change in carbon content due to the joining process can be observed in the graph as carbon diffuses from the first material 5 and the core part 2 into the material of the u-shaped annular part 4 more and more as the joining process proceeds $1t$, $2t$ and $3t$. Most diffusion occurs from the carbon rich annular part 4. The carbon content of the first material 5 and annular part 4 in this example is almost 1 and 3 wt % respectively. Here it can be clearly seen that the carbon content have not increased dramatically at any points, which indicates that the carbon has not formed cementites nor more complex carbides that can be larger in comparison to the surrounding structure, for instance a martensitic structure, thus generally weaker than the surrounding materials. This would be unacceptable in high performance mechanical components, such as high quality bearing components. In this figure is shown only on material in the u-shaped annular part 4 in between the first material 5 and the core part 2 to be joined. There could also be layers in u-shaped annular part 4 of suitable materials known to the person skilled in the art to achieve the results according to the principle of the inventive method described herein. The distance unit of the x-axis is not specified in this graph since it functions more as an example describing the principle with exaggerated proportions, but a typical distance where this would occur would be 5-20 mm from the surface of a component to be joined, for instance a from the bearing race, and the typical thickness of the third material is in the order of millimeters typically 0.5 to 5 mm. Other thicknesses may be used, such as up to 10 mm thickness.

Figure 3:
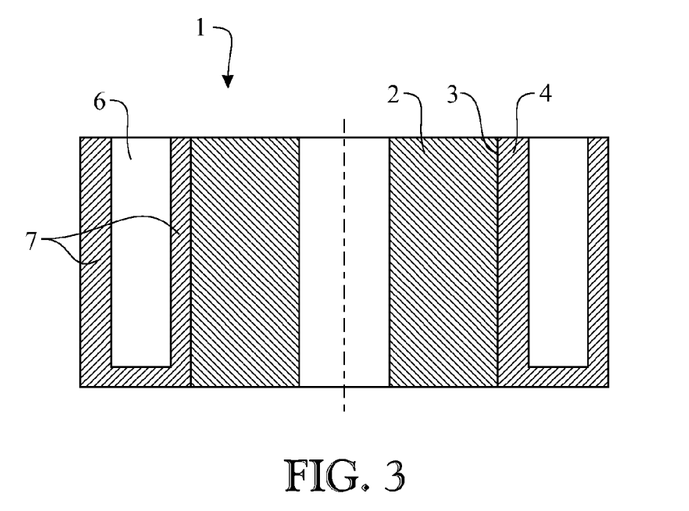
FIG. 3 shows a bearing component part according to the invention.

FIG. 3 shows the bearing component part 1 intended to be used in the method of forming a radial bearing ring according to the invention. The core part 2 can be seen with the u-shaped annular part 4 being attached to and along the circumferential surface 3 of the core part 2. The u-shaped part is attached in one of its two opposing sides 7, in this case the radially inner side, indicating that it is inner ring to be formed since it is attached on the ring's radially outer circumferential surface. The first material (5 in FIG. 4) will be filled in the space 6 formed by the u-shape, the u-shape revealed as the annular part 4 is seen in a radial cross sectional view in axial direction of annular part 4. The same principle would apply if it would be a roller to be formed, only the core part 2 bearing component part 1 would be solid instead of hollow, unless it is a hollow roller that would be formed. The u-shaped circular 4 part could also consist if different materials in itself, so that one of the opposing sides 7 fulfills the relation that carbon activity is greater than the carbon activity of the first material 5, meaning carbon will be diffused from the opposing side 7 of the annular part 4 the first material resulting in a surface enrichment of carbon of the first material 5 to make the surface even better. I.e. one part of the u-shaped annular part has a material to facilitate the join of materials during diffusion welding, whereas another part of the annular part 4 comprises a material to function as a surface enrichment of carbon.

Figure 4:
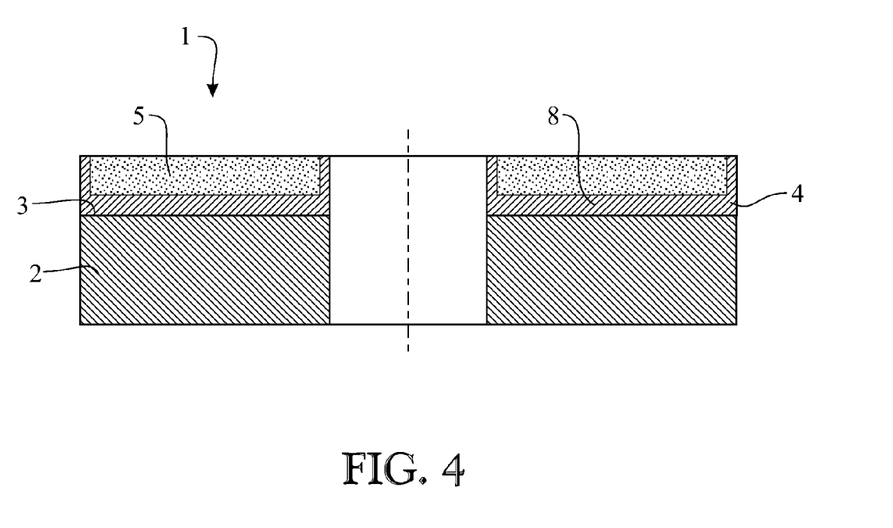
FIG. 4 shows a bearing component part according to the invention.

FIG. 4 shows the bearing component part 1 intended to be used in the method of forming an axial thrust bearing ring according to the invention. The core part 2 can be seen with the u-shaped annular part 4 being attached to and along the circumferential surface 3 of the core part 2. The u-shaped part is attached in its base side 8. The first material 5 has been filled in the space (6 in FIG. 3) formed by the u-shape, the u-shape revealed as the annular part 4 is seen in a radial cross sectional view in axial direction of annular part 4.

Figure 5:
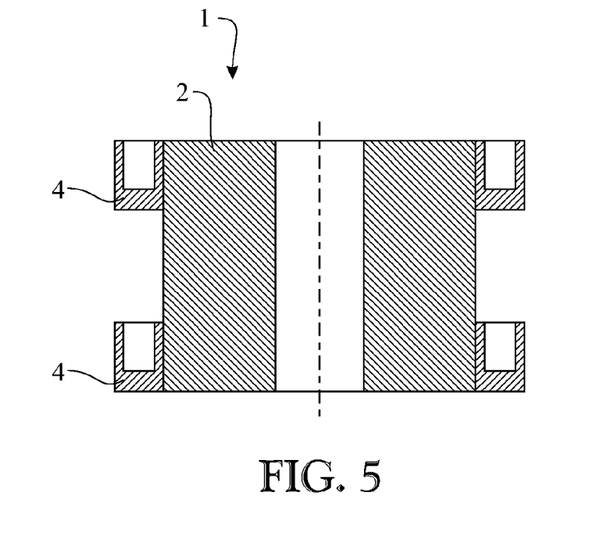
FIG. 5 shows a bearing component part according to the invention having several annular parts.

FIG. 5 shows the bearing component part 1 intended to be used in the method of forming a bearing component (9 in FIGS. 1$a$ and 1$b$) according to the invention as disclosed in FIG. 3, only that several u-shaped annular parts 4 are attached to the core part 2. In this case several u-shaped annular parts 4 are being used to form flanges.

Figure 6:
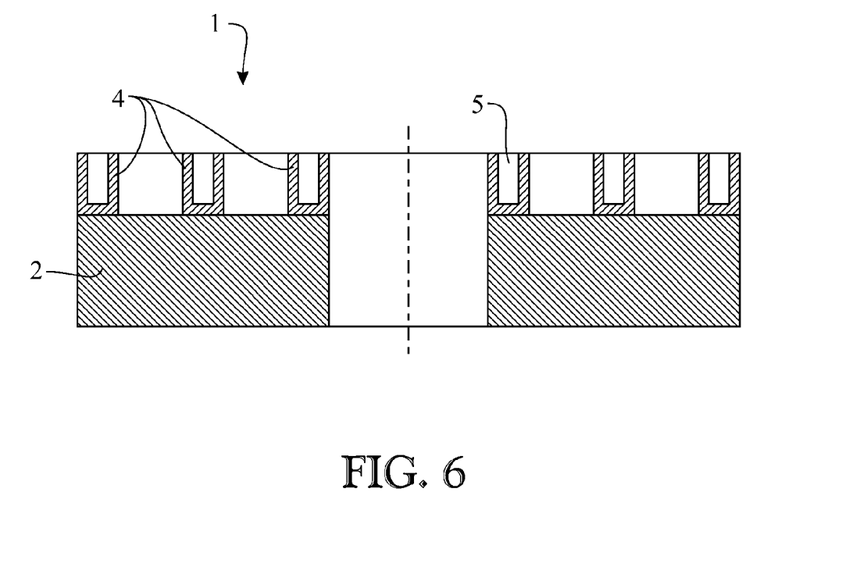
FIG. 6 shows a bearing component part according to the invention having several annular parts.

FIG. 6 shows the bearing component part 1 intended to be used in the method of forming a bearing component (9 in FIGS. 1$a$ and 1$b$) according to the invention as disclosed in FIG. 4, only that several u-shaped annular parts 4 are attached to the core part 2. In this case several u-shaped annular parts 4 are being used to form flanges.

Figure 7:
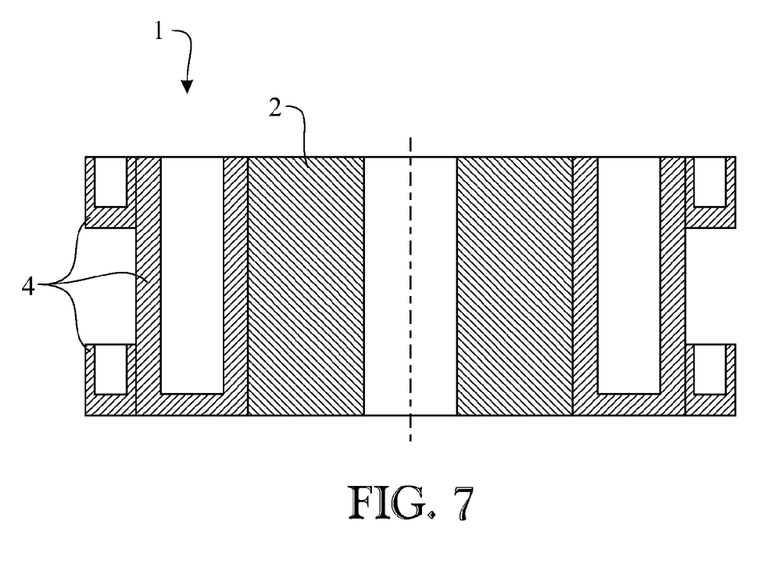
FIG. 7 shows a bearing component part according to the invention having several annular parts forming both a raceway and flanges.

FIG. 7 shows the bearing component part 1 intended to be used in the method of forming a bearing component (9 in FIGS. 1$a$ and 1$b$) according to the invention as disclosed in FIG. 3, only that several u-shaped annular parts 4 are used. In this case several u-shaped annular parts 4 are being used to form flanges. The u-shaped annular parts 4 to form flanges are fastened to another u-shaped annular part 4 attached to the core part 2 to form a bearing raceway. This can be useful when there is a benefit of using a raceway material and a flange material of different qualities.

Figure 8:
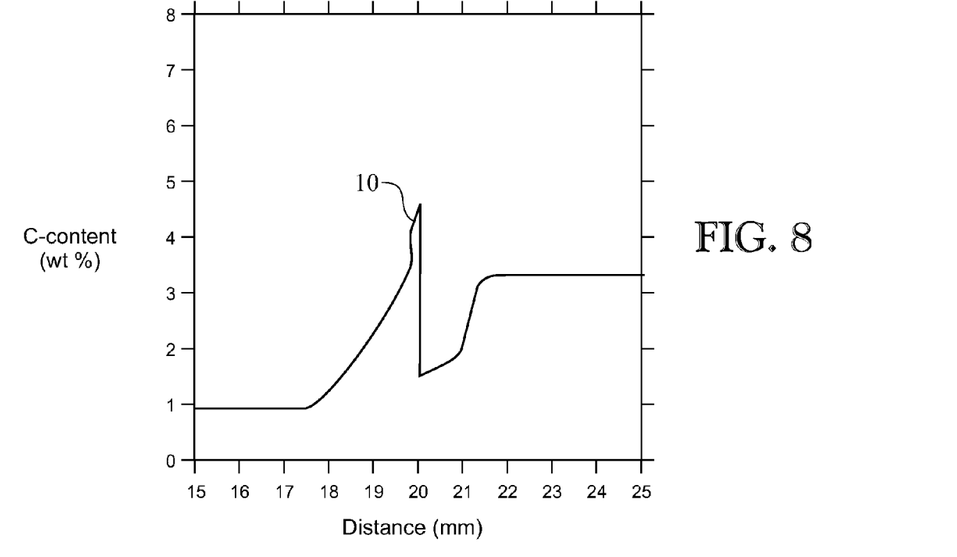
FIG. 8 shows a graph illustrating an undesirable carbon content change.

FIG. 8 shows a graph illustrating an undesirable peak 10 in carbon content. The carbon has clearly moved from one material to the other. The carbon content clearly exceeds the carbon contents of one of the materials of 3.5 wt % at one point reaching almost 5 wt % carbon at a depth of 20 mm from the surface of the materials to be joined, in this case a bearing race. The curve is un-linear. The carbon content shall be measured along a cross section of the joined materials, the cross section being made perpendicular to the surface where the two materials join. Having this said, the surface to be joined does by no means need to be flat, since also rounded surfaces have a perpendicular direction.

Figure 9:
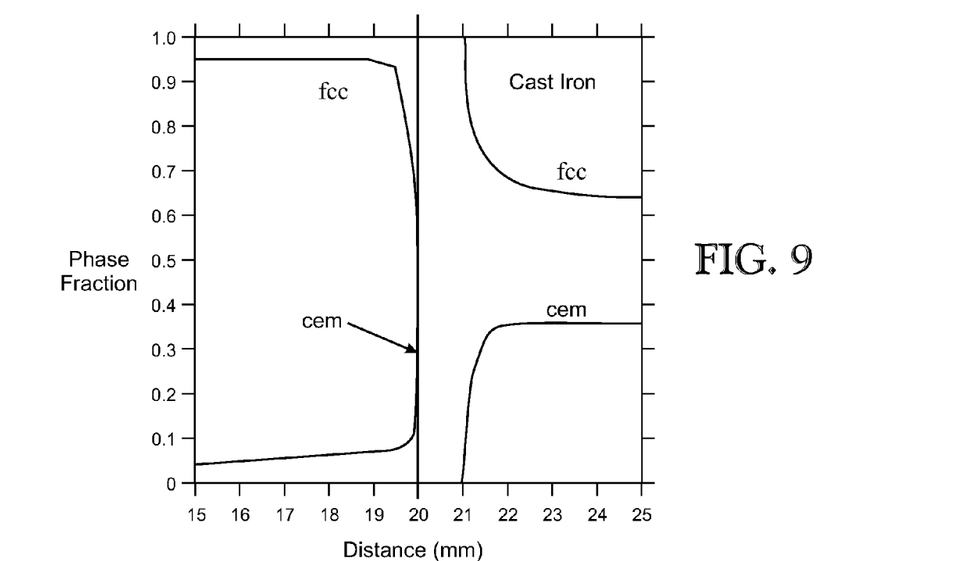
FIG. 9 shows a graph illustrating a phase fraction during the undesirable carbon content change from FIG. 8.

FIG. 9 shows a graph illustrating a phase fraction during the undesirable peak (5 in FIG. 7) in carbon content change from FIG. 8. From the simulations at the process temperature it can be clearly seen that the carbon content increase that went beyond carbon content of one of the materials in an un-linear way, has resulted in a zone where the austenite (fcc) microstructure has increased dramatically, simultaneously as larger fraction of weaker brittle microstructure phases such as cementite (cem) networks or other complex metal carbides has formed. Both microstructures went from being around 10% of the total microstructure to around 90% at a depth off 20 mm from the surface of the bearing component. This may significantly reduce the strength of any or both of the two joined materials. The cementite structure does not necessarily have to occur during the joining as such, but the higher level of carbon content could react and form a weak and brittle cementite phases during a subsequent heat treatment. At a depth off 21 mm from the surface of the bearing component we can see the normal face fractions of the materials at the process temperature again consisting of cementite and austenite cast iron to a large extent.

The invention claimed is:
1. A bearing component part for use in a diffusion welding process, comprising:
   a core part presenting a first circumferential surface; and
   at least one annular part presenting a second circumferential surface, wherein the core part and the annular part are attached to and along each other in a circumferential manner through the first and second circumferential surfaces, wherein the at least one annular part is substantially u-shaped in a cross sectional view, comprising two opposing sides connected by a base side together forming a space, wherein the at least one annular part is arranged to receive a first material in the space formed by the u-shape.

2. The bearing component part for according to claim 1, wherein the second circumferential surface of the annular part being connected to the core part, is one of the opposing sides of the u-shape.

3. The bearing component part for according to claim 1, wherein the second circumferential surface of the annular part being connected to the core part is the base side of the u-shape.

4. The bearing component part according to claim 1, wherein the annular part is a low carbon steel.

5. The bearing component part according to claim 1, wherein the annular part is a low carbon steel having a carbon content of less than 0.3%.

6. The bearing component part according to claim 1, wherein the annular part is a ferritic steel.

7. The bearing component part according to claim 1, wherein the annular part is a sheet metal.

8. The bearing component part according to claim 1, wherein the thickness of the annular part is 0.5-10 mm.

9. The bearing component part according to claim 1, wherein the core part comprises a cast iron.

10. The bearing component part according to claim 1, wherein the core part comprises a cast iron with a carbon content of at least 2 wt %.

11. The bearing component part according to claim 1, wherein the core part is a cast steel.

12. The bearing component part according to claim 1, wherein the core part is a cast steel with a carbon content of 0.5 wt % or less.

13. A method to form a bearing component by diffusion welding, the method comprising steps of:
 providing a bearing component part, the bearing component part comprising:
  a core part presenting a first circumferential surface; and
  at least one annular part presenting a second circumferential surface,
  wherein the core part and the annular part are attached to and along each other in a circumferential manner through the first and second circumferential surfaces,
  wherein the at least one annular part is substantially u-shaped in a cross sectional view, comprising two opposing sides connected by a base side together forming a space,
  wherein the at least one annular part is arranged to receive a first material in the space formed by the u-shape,
 placing a first material in the space formed by the u-shaped annular part,
 sealing the space formed by the u-shaped annular part, creating a closed space,
 performing the diffusion welding process.

14. The method according to claim 13, wherein the first material and the core part material presents a carbon potential at the temperature of joining.

15. The method according to claim 13, wherein the first material is a high cleanliness steel.

16. The method according to claim 13, wherein the first material is any of:
 M50,
 M50 NIL,
 XD15NW,
 Bearing steel as shown in ISO 683-17:1999 pages 9,
 Stainless tool steel,
 Stainless steel suitable for martensitic hardening,
 N-alloyed stainless steel, suitable for martensitic hardening,
 Stainless steel suitable for surface enrichment and martensitic hardening.

17. The method according to claim 13, wherein the method is accomplished by hot isostatic pressing.

18. The method according to claim 13, wherein the first material is in powder form before heating.

19. The method according to claim 13, wherein the bearing component is any one of:
 an inner ring of a bearing,
 an outer ring of the bearing, or
 a roller of a roller bearing.

20. The method according to claim 13, wherein at least one of the opposing sides and the base side of the u-shaped annular part is subsequently removed from the bearing component.

21. The method according to claim 20, wherein the removal of at least one of the opposing sides and the base side of the u-shaped annular part is made by one of:
 a subsequent grinding step, or
 a subsequent cutting step.

22. A bearing component formed by using the bearing component part, the bearing component comprising:
 a core part presenting a first circumferential surface; and
 at least one annular part presenting a second circumferential surface,
 wherein the core part and the annular part are attached to and along each other in a circumferential manner through the first and second circumferential surfaces,
 wherein the at least one annular part is substantially u-shaped in a cross sectional view, comprising two opposing sides connected by a base side together forming a space,
 wherein the at least one annular part is arranged to receive a first material in the space formed by the u-shape.

* * * * *